(12) United States Patent
Wyner et al.

(10) Patent No.: US 6,531,419 B1
(45) Date of Patent: Mar. 11, 2003

(54) MULTI-LAYER PROTECTIVE FABRICS

(75) Inventors: Daniel Wyner, North Scituate, RI (US); Robert C. Koeppel, North Easton, MA (US)

(73) Assignee: R. H. Wyner Associates, Inc., West Bridgewater, MA (US)

( * ) Notice: Subject to any disclaimer, the term of this patent is extended or adjusted under 35 U.S.C. 154(b) by 0 days.

(21) Appl. No.: 09/346,096

(22) Filed: Jul. 1, 1999

(51) Int. Cl.[7] .................... B32B 27/04; B32B 27/12; B32B 27/14; B27N 9/00

(52) U.S. Cl. .................... 442/136; 442/76; 442/79; 442/86; 442/149; 442/286; 428/195; 428/921

(58) Field of Search ................... 428/921, 195; 442/76, 79, 86, 136, 149, 286

(56) References Cited

U.S. PATENT DOCUMENTS

| | | | |
|---|---|---|---|
| 3,899,810 A | 8/1975 | Stanley et al. | 28/72.6 |
| 4,034,417 A | 7/1977 | Ellis | 2/81 |
| 4,594,286 A | 6/1986 | McKinney et al. | 428/245 |
| 4,758,465 A | 7/1988 | McKinney et al. | 428/252 |
| 4,803,116 A | 2/1989 | Amano et al. | 428/286 |
| 4,860,382 A | 8/1989 | Markwell | 2/82 |
| 5,026,591 A | 6/1991 | Henn et al. | 428/198 |
| 5,098,770 A | 3/1992 | Paire | 428/198 |
| 5,182,163 A | 1/1993 | Wheat et al. | 428/224 |
| 5,220,692 A | 6/1993 | Cox | 2/48 |
| 5,221,572 A | 6/1993 | Meunier | 428/231 |
| 5,236,769 A * | 8/1993 | Paire | 428/196 |
| 5,264,276 A | 11/1993 | McGregor et al. | 428/252 |
| 5,418,054 A | 5/1995 | Sun | 428/308.4 |
| 5,565,254 A | 10/1996 | Norvell | 428/71 |
| 5,569,507 A | 10/1996 | Goodwin et al. | 428/76 |
| 5,700,544 A | 12/1997 | Goodwin et al. | 428/76 |
| 5,740,551 A | 4/1998 | Walker | 2/16 |

FOREIGN PATENT DOCUMENTS

| | | |
|---|---|---|
| CA | 1056553 | 6/1979 |
| DE | 681600 | 4/1990 |
| EP | 0 451 665 A1 | 10/1991 |
| EP | 0 465 817 A1 | 5/1992 |
| EP | 0 819 790 A1 | 1/1998 |
| JP | 63-72527 * | 2/1988 |
| JP | 7-88057 * | 4/1995 |
| JP | 8-197683 * | 6/1996 |
| JP | 8-294982 * | 12/1996 |
| WO | WO 97/00710 * | 1/1997 |

* cited by examiner

*Primary Examiner*—Cheryl A. Juska
*Assistant Examiner*—Jenna-Leigh Befumo
(74) *Attorney, Agent, or Firm*—Fish & Richardson P.C.

(57) ABSTRACT

A multi-layer protective fabric includes a thin urethane film, a flame-retardant fibrous layer, and a flame-retardant microporous layer. The film includes flame retardant additives, blocks a liquid chemical from passing through it, and breathes by an adsorption/de-sorption process to permit water vapor to pass through it. The fibrous layer is bonded on one surface of the film. The urethane layer is bonded on the other surface of the film.

26 Claims, 2 Drawing Sheets

MULTI-LAYER PROTECTIVE FABRICS

BACKGROUND

This invention relates to multi-layer protective fabrics.

Garments used in fire fighting, for example, are made of fabrics that not only protect the fire fighter from the heat and flame of the fire, but also are waterproof and allow water vapor to pass from inside to outside the garment.

One such fabric is a laminate of a first layer comprising rayon and NOMEX (a fire-retardant, high-strength woven or non-woven fibrous material available from duPont) and a second layer of a micro-porous urethane film (e.g., P55FR available from Porvair of King's Lynne, UK). A micro-porous material is, for example, one that has pores sized to permit vapor molecules to pass, while blocking water molecules. The urethane film, which is normally flammable, is made fire retardant by loading it with fire retardant components during manufacture by a solvent process.

The National Fire Protection Agency (NFPA) recently changed its published standards to require fire fighting garments also to resist penetration by any of a list of chemicals sprayed in a specified way against the surface of the garment.

One attempt to meet the new standard involved coating the micro-porous urethane film of the fabric described above with a chemical resistant coating.

SUMMARY

In general, in one aspect, the invention features a multi-layer protective fabric in which a breathable barrier film blocks a liquid chemical while permitting moisture vapor to pass through it. The film is thinner than 1 mil and contains a fire retardant component. Layers are bonded on both sides of the film by fire retardant adhesive.

In general, in another aspect of the invention, a multi-layer protective fabric includes a thin urethane film, a flame-retardant fibrous layer, and a flame-retardant micro-porous urethane layer. The film includes flame-retardant additives, blocks a liquid chemical from passing through it, and breathes by an absorption/de-sorption process to permit water vapor to pass through it. The fibrous layer is bonded on one surface of the film. The micro-porous urethane layer is bonded on the other surface of the film.

Implementations of the invention may include one or more of the following features. The urethane film may have a thickness in the range of 0.1 to 1 mils, preferably 0.15 to 0.25 mils, e.g., about 0.2 mils thick. Adhesive may bond the urethane film to at least one of the fibrous layers or the micro-porous layer. The adhesive may be distributed in a pattern in which at least 75%, preferably at least 85%, most preferably at least 90% of the film is free of adhesive. The adhesive may contain flame-retardant components. The fibrous layer may include NOMEX, Kevlar, or PBI. The micro-porous urethane layer (e.g., PORVAIR) may include flame-retardant components.

In general, in another aspect of the invention, a multi-layer fabric includes a sandwich that has a core and layers bonded on the core. The core has a weight per square meter less than 2½ grams and is impenetrable by a liquid chemical and breathable to water vapor. The fire-retardant layers are bonded on each side of the core, at least one of the fire-retardant layers being penetrable by the liquid chemical, impenetrable by water, and breathable to water vapor.

Among the advantages of the invention may be one or more of the following.

The fabric meets NFPA standards for flame-retardancy and chemical resistance while being waterproof and breathable. A fabric of the required characteristics can be produced repeatably and predictably. The fabric is relatively inexpensive to make. The polyethylene-backed film is easily stored and shipped and manipulated during the lamination process. The barrier properties of the film are maintained prior to the lamination process.

Other advantages and features will become apparent from the following description, and from the claims.

DESCRIPTION

DESCRIPTION

Figure 1:
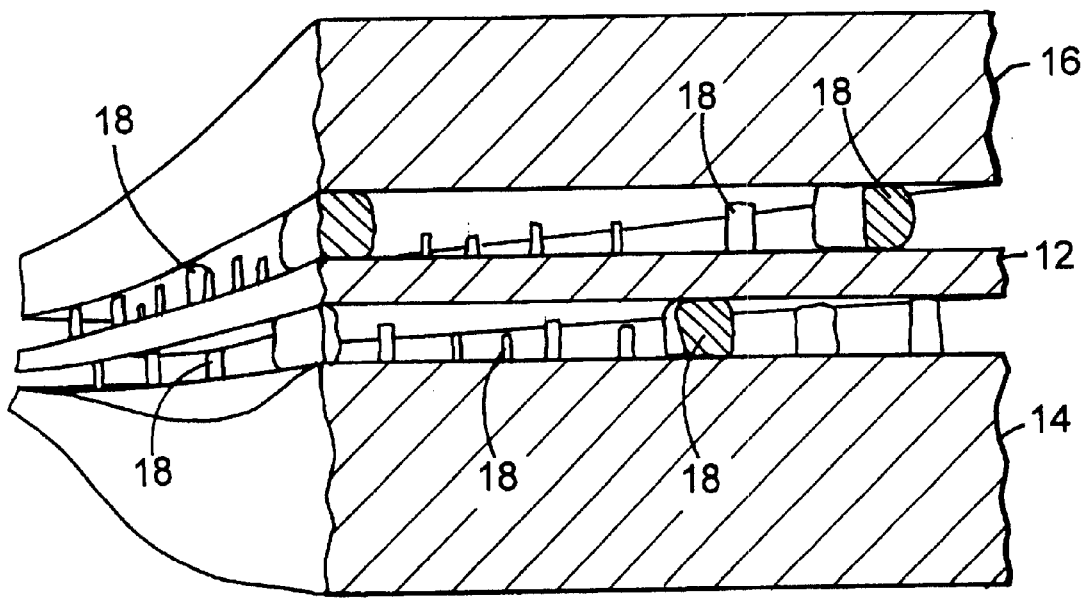
FIG. 1 is an enlarged, not-to-scale, cut-away perspective view of a multi-layer fabric.

As seen in FIG. 1, a multi-layer protective fabric 10 is flame-retardant, chemical-resistant, waterproof, and breathable. Fabric 10 includes a breathable, chemical resistant barrier film 12 laminated between a high-strength, flame-resistant woven or non-woven material 14 (e.g., NOMEX, product REVF243, available from Freudenberg, of Weinheim, Germany), and a flame-resistant micro-porous layer 16 (e.g., P55FR), using a flame retardant adhesive 18. The thickness of the space in which the adhesive lies may be somewhat exaggerated in FIG. 1. Also, the micro-porous structure of layer 16 is not illustrated.

Film 12 may be a urethane film extruded from a breathable urethane stock (available as TX1535FR from Omniflex of Greenfield, Mass.). Because film 12 would otherwise be highly flammable, a fire retardant additive is included as part of the urethane stock used to load the extruder.

The resulting extruded film by itself would still be sufficiently flammable to fail a vertical flame test (e.g., flame test method 5903.1 specified in NFPA 701 Standard on Protective Ensemble for Structural Fire-Fighting). The flammability of the film is reduced by making the film thin and by using flame retardant adhesive to bind the layer to other layers of the multi-layer protective fabric. Consequently, the multi-layer protective fabric meets the NFPA flame retardancy requirements.

By making the film 12 thin, the weight of flammable material per square yard is relatively small, e.g., as little as 2½ grams/square meter. To reduce the flammable mass, it would be desirable to make film 12 as thin as possible while retaining its behavior as a barrier to liquid chemicals, its breathability, its extrudability, and its ability to be laminated after extrusion. (A breathable film is, for example, one that provides a continuous barrier to liquids but allows moisture vapor to pass by an adsorption/de-sorption process on the surface of the film.)

If the film were made too thin, it would lack the strength needed during the next processing step, described below, and would be characterized by gaps and holes that would prevent it from serving as a barrier to chemicals.

Although 0.2 mils has been found to be a useful thickness, other thickness in the range of 0.1 to 0.5 mils (2.5 to 12.5 microns), preferably 0.15 to 0.25 mils (3.75 to 6.25 microns), are also believed to exhibit a useful combination of the desired properties. It is likely that an even thicker film could be used, e.g., as thick as 15 to 20 microns (0.6 to 0.79 mils) or even 25 microns (1 mil).

In theory, if the urethane film were too thick, the fire retardant properties of the film would be lost. Attempting to compensate by increasing the proportion of fire retardant components in the urethane stock would degrade the breathability of the extruded film.

Figure 2:
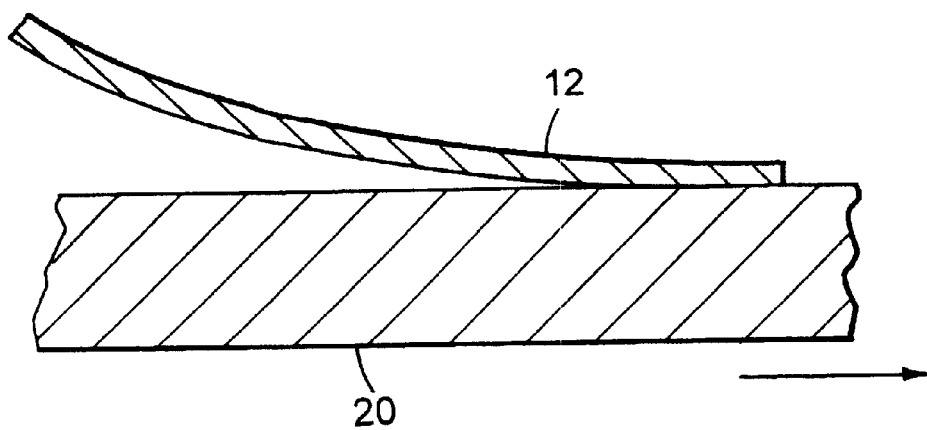
FIG. 2 is a sectional side view of a laminating process.

Because film 12 is thin, it would be relatively weak and difficult to handle and to laminate without temporarily casting it onto a pre-formed 2 mils thick polyethylene backing material 20, as seen in FIG. 2. The warm, soft, just extruded film 12 is continuously cast onto the backing material 20.

The urethane film is made by horizontal or vertical casting extrusion. The film is extruded onto the polyethylene layer while thermoplastic. The extruder melts the urethane granules and forms the urethane layer by passing the molten urethane through a sheet die. The thickness of the urethane film is controlled by adjusting the speed of production or varying the die opening. In the sheet die, the temperature of the urethane is about 400 degrees F. The polyethylene backing layer is relatively cool and is fed from a roll.

From a position that is near to the sheet die, the two layers are simultaneously pulled by a set of nip rolls, including a rubber roll and a steel roll. The two rolls press the two layers together while the urethane is still relatively warm. The two layers of the resulting sheet are lightly bonded together so that the polyethylene layer can later be peeled. The steel roll may have a matte finish or a simple polytetrafluoroethylene release coating. The resulting two-layer sheet is trimmed at the edges and wound on a take up roll. Alternately, the urethane film may be produced from a casting die by being drawn vertically downward and pressed to the polyethylene layer by calendar rolls.

The micro-porous layer 16 is 2.25 mils thick and (it is believed) cannot easily be made thinner because the fire retardant additive (ammonium oxide and brominated compounds) cannot be ground fine enough to make a functional thinner film.

Figure 3:
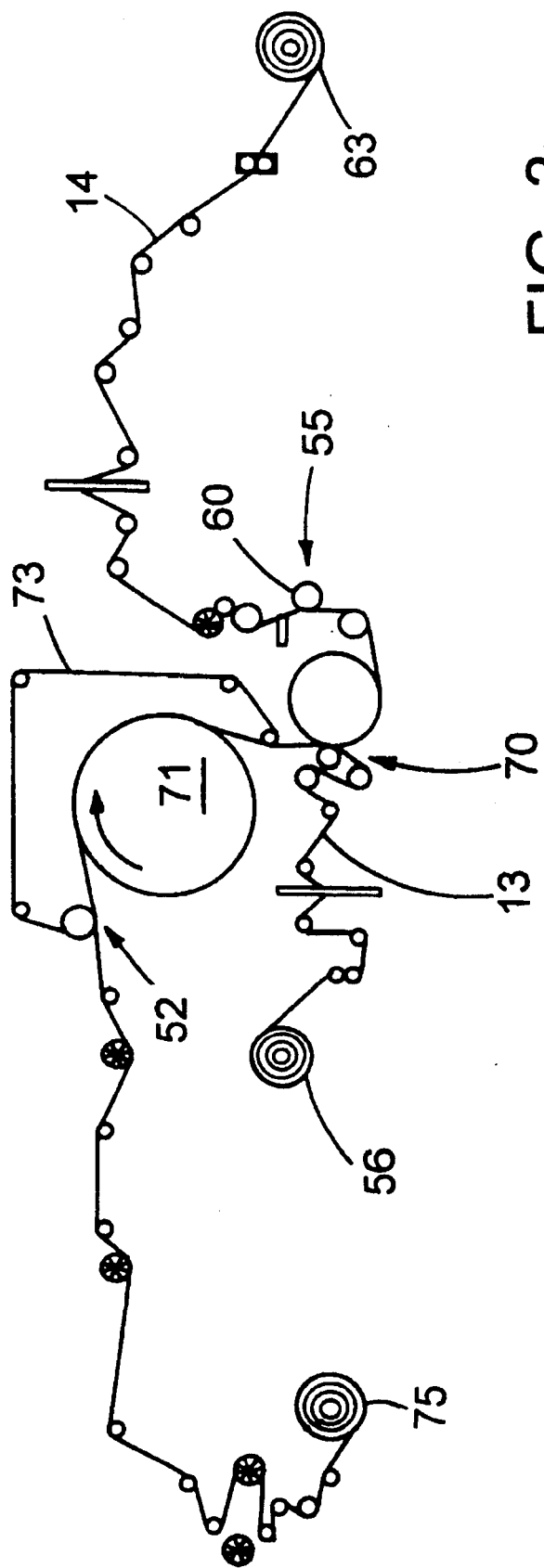
FIG. 3 is a schematic view of a processing line.

As seen in FIG. 3, in the first pass of a two-pass sequence for manufacturing the multi-layer fabric 10, the NOMEX web 14 is pulled from a supply roll 63 at the front end of the line to a station 55 where the fire retardant adhesive is applied by a gravure roll 60 in a 65 quads per square inch quad pattern (discussed below). The pattern on the roll is 5 mils deep.

At a laminating station 70, the adhesive bearing side of the NOMEX web meets the polyethylene backed breathable urethane film 13 that has been withdrawn from a feed roll 56. The backed film and the NOMEX web are nipped at station 70 to form a pre-laminate. The pre-laminate passes over a large roll 71 and is held against the surface of roll 71 by a re-circulating blanket 73. The pre-laminate is fed onto a take-up roll 75 at the back end of the line. The pre-laminate is then allowed to sit for at least twelve hours at room temperature for curing.

After the first pass and prior to a second pass, the polyethylene backing is stripped from the pre-laminate. The second pass is done on essentially the same processing line shown in FIG. 3 with the polyethylene-stripped pre-laminate loaded on feed roll 63, the micro-porous layer loaded on feed roll 56, and the final multi-layer fabric taken up on roll 75. The fabric is then allowed to sit for 18 hours to cure at room temperature before slitting and inspection.

The multi-layer fabric may be covered with additional outer layers (for example, a stitch bonded thermal barrier of woven or non-woven Nomex or Kevlar) to produce a finished fabric that can be patterned, cut, and stitched to form a finished garment, e.g., a fire fighter's coat.

The adhesive that bonds the layers may be a cross-linking, fire retardant adhesive available from Soluol of Warwick, R.I. Alternative adhesives could include epoxies and hot melts. The adhesive is made fire retardant by mixing in, e.g., a 9% concentration of fire retardant additive (such as a brominated compound) to the total by weight of the cross-linking adhesive. The adhesive cures by cross-linking at room temperature.

The pattern of the adhesive is, for example, 65 quads per square inch at a depth of about 6–7 mils. The quad pattern is a pattern of three-dimensional squares of adhesive. The squares are open so that only a small portion of the area treated is covered with adhesive while a large portion of the area remains clean.

Other patterns and numbers of quads per square inch could be used including dot, diamond, tri-helical, or any other pattern that provides a desired lay-down weight of adhesive and leaves a significant open area. A lay-down weight of, for example, about 4 grams per square meter (dried adhesive weight) on each side of the barrier layer works well. The depth of the pattern of applied adhesive should be great enough to assure good bonding but not so great that the open space of the pattern is significantly reduced by excess adhesive flowing into the open parts of the pattern.

The non-adhesive (clean) portions of the pattern could range from 75 to 90%, preferably 85 to 90%, most preferably 90%. The benefit of using such a pattern is that it causes relatively little obstruction of the moisture vapor transmission properties (breathability) of the barrier layer, while achieving a strong bond between the fabric layers. The pattern should provide enough adhesive coverage to yield the needed fire retardancy to the otherwise flammable barrier layer and yet be open enough to maintain the breathability and washability of the finished fabric.

EXAMPLES OF LAMINATED FABRICS FOLLOW

1. A flame retardant and chemical protective composite fabric consisting of a layer of 2.3 oz./sq. yd. Freudenberg Style REVF243 melamine non-woven laminated to an Omniflex 0.2 mil TX1535FR urethane film with an additional layer of Porvair's P55FR film laminated on top of the TX1535FR. The materials are laminated together by applying an 1170 FR adhesive from Soluol Chemical by way of a 65 quad rotogravure print roll. The resulting composite meets or exceeds performance specifications as stated in NFPA 701 Standard On Protective Ensemble for Structural Firefighting.

2. A flame retardant and chemical protective composite fabric consisting of a layer of 3.2 oz./sq. yd. duPont Style 332 Nomex woven laminated to an Omniflex 0.2 mil TX1535FR urethane film with an additional layer of Porvair's P55FR film laminated on top of the TX1535FR. The materials are laminated together by applying an 1170 FR adhesive from Soluol Chemical by way of a 65 quad rotogravure print roll. The resulting composite meets or exceeds performance specifications as stated in NFPA 701 Standard On Protective Ensemble for Structural Firefighting.

3. A flame retardant and chemical protective composite fabric consisting of a layer of 2.7 oz./sq. yd. dupont Style E89 non-woven laminated to an Omniflex 0.2 mil TX1535FR urethane film with an additional layer of Porvair's P55FR film laminated on top of the TX1535FR. The materials are laminated together by applying an 1170 FR adhesive from Soluol Chemical by way of a 65 quad rotogravure print roll. The resulting composite meets or exceeds performance specifications as stated in NFPA 701 Standard On Protective Ensemble for Structural Firefighting.

Other embodiments are within the scope of the following claims.

For example, a variety of other fabrication sequences would be possible including ones in which the three layers are laminated simultaneously.

The NOMEX could be replaced by other similar materials, including Kevlar, PBI, or modacrylic. Suppliers include duPont, Southern Mills, Freudenberg, and Burlington.

What is claimed is:

1. A multi-layer protective fabric comprising
    a thin urethane film that
        includes flame retardant additives,
        blocks a liquid chemical from passing through it, and
        breathes by an adsorption/de-sorption process to permit water vapor to pass through it,
    a flame-retardant fibrous layer bonded on one surface of the film, and
    a flame-retardant micro-porous urethane layer bonded on the other surface of the film.

2. The fabric of claim 1 in which the urethane film has a thickness in the range of 0.1 to 1 mils.

3. The fabric of claim 1 in which the urethane film is about 0.2 mils thick.

4. The fabric of claim 1 further comprising adhesive that bonds the urethane film to at least one of the fibrous layer or the micro-porous layer.

5. The fabric of claim 4 in which the adhesive is distributed in a manner in which at least 75% of the film is free of adhesive.

6. The fabric of claim 4 in which the adhesive contains flame-retardant components.

7. The fabric of claim 1 in which the fibrous layer comprises at least one of aramid fibers or polybenzimidazole fibers.

8. The fabric of claim 1 in which the micro-porous urethane layer comprises flame-retardant components.

9. The fabric of claim 1 in which the urethane film has a thickness in the range of 0.15 to 0.25 mils.

10. The fabric of claim 5 in which the adhesive is distributed in a pattern in which at least 85% of the film is free of adhesive.

11. The fabric of claim 10 in which the adhesive is distributed in a pattern in which at least 90% of the film is free of adhesive.

12. A multi-layer fabric comprising
    a urethane film including flame-retardant additives, the film being about 0.2 mils thick, that blocks a liquid chemical from passing through it, and breathes by an adsorption/de-sorption process that permits water vapor to pass through it,
    a flame-retardant fibrous layer bonded on one surface of the film by a flame-retardant adhesive arranged in a pattern in which at least 75% of the film is free of adhesive, and
    a flame-retardant micro-porous urethane layer bonded on the other surface of the film by a flame-retardant adhesive arranged in a pattern in which at least 75% of the film is free of adhesive.

13. A multi-layer fabric comprising
    a sandwich comprising
        a core having a weight per square meter less than 2½ grams, the core being impenetrable by a liquid chemical and breathable to water vapor, and
        fire-retardant layers bonded one on each side of the core, at least one of the fire-retardant layers being penetrable by a non-aqueous liquid chemical, impenetrable by water, and breathable to water vapor.

14. A fire fighting garment comprising
    a sandwich comprising
        a core having a weight per square meter less than 2½ grams, the core being impenetrable by a liquid chemical and breathable to water vapor, and
        fire-retardant layers bonded one on each side of the core, at least one of the fire-retardant layers being penetrable by a non-aqueous liquid chemical, impenetrable by water, and breathable to water vapor.

15. The fabric of claim 13 in which the core has a thickness in the range of 0.1 to 1 mils.

16. The fabric of claim 13 in which the core is about 0.2 mils thick.

17. The fabric of claim 13 further comprising adhesive that bonds the core to at least one of the fire retardant layers.

18. The fabric of claim 17 in which the adhesive is distributed in a pattern in which at least 75% of the film is free of adhesive.

19. The fabric of claim 17 in which the adhesive contains flame-retardant components.

20. The fabric claim 13 in which the fibrous layer comprises at least one of aramid fibers or polybenzimidazole fibers.

21. The garment of claim 14 in which the core has a thickness in the range of 0.1 to 1 mils.

22. The garment of claim 14 in which the core is about 0.2 mils thick.

23. The garment of claim 14 further comprising adhesive that bonds the core to at least one of the fire retardant layers.

24. The garment of claim 23 in which the adhesive is distributed in a pattern in which at least 75% of the film is free of adhesive.

25. The garment of claim 23 in which the adhesive contains flame-retardant components.

26. The garment of claim 14 in which the fibrous layer comprises at least one of aramid fibers or polybenzimidazole fibers.

* * * * *